United States Patent [19]

Imaseki et al.

[11] Patent Number: 5,374,877
[45] Date of Patent: Dec. 20, 1994

[54] APPARATUS AND METHOD OF CONTROLLING POWER OF ELECTRIC MOTOR CAR

[75] Inventors: Takashi Imaseki, Zushi; Kiyotaka Ozaki, Yokosuka; Takeshi Asou, Yokohama, all of Japan

[73] Assignee: Nissan Motor Co., Ltd., Japan

[21] Appl. No.: 95,554

[22] Filed: Jul. 26, 1993

[30] Foreign Application Priority Data

Aug. 5, 1992 [JP] Japan .................. 4-229329

[51] Int. Cl.$^5$ ............................................ H02P 1/54
[52] U.S. Cl. ........................... 318/34; 318/139; 123/90.15; 364/426.05
[58] Field of Search .............. 318/139, 34; 123/90.15; 364/426.05

[56] References Cited

U.S. PATENT DOCUMENTS

| | | | |
|---|---|---|---|
| 3,902,565 | 9/1975 | Farrall | 318/139 |
| 4,958,287 | 9/1990 | Sugimura et al. | 364/424.01 |
| 4,969,103 | 11/1990 | Maekawa | 364/426.04 |
| 5,143,037 | 9/1992 | Sawamato | 123/90.15 |
| 5,195,470 | 3/1993 | Ikeura | 123/90.15 |

*Primary Examiner*—William M. Shoop, Jr.
*Assistant Examiner*—Karen Masih
*Attorney, Agent, or Firm*—Lowe, Price, LeBlanc & Becker

[57] ABSTRACT

A travel condition detecting section detects travel conditions of an electric motor car. According to the detected travel conditions, a required output calculating section calculates a required travel output. According to the calculated required travel output, a control commanding section determines travel outputs to be allocated to a plurality of motors coupled to driven wheels of the electric motor car, respectively in such a way that the total power consumption of the motors can be minimized, and further outputs control commands to the motors on the basis of the determined travel outputs allocated to the respective motors.

14 Claims, 5 Drawing Sheets

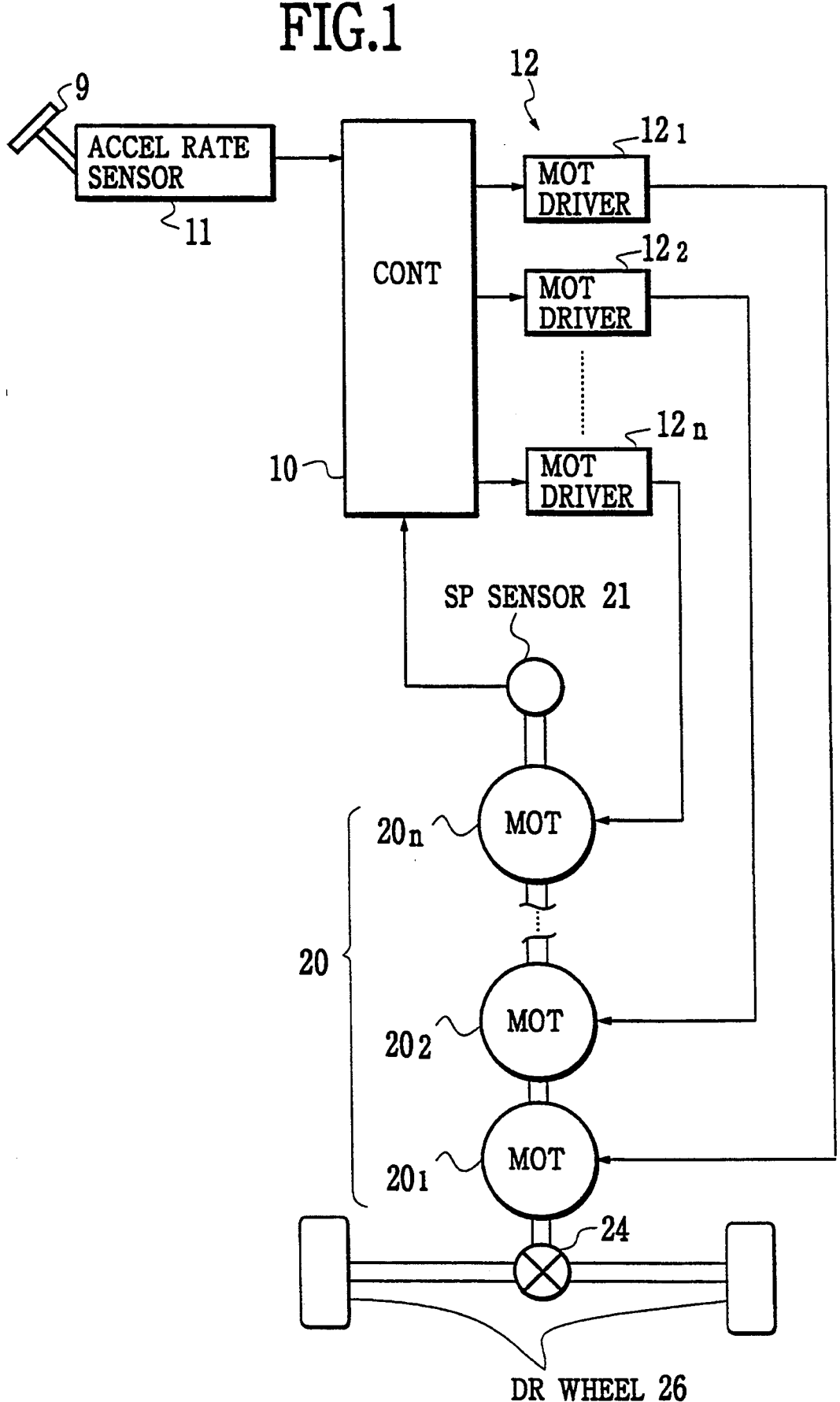

APPARATUS AND METHOD OF CONTROLLING POWER OF ELECTRIC MOTOR CAR

BACKGROUND OF THE INVENTION

The present invention relates to an apparatus and a method of controlling power of an electric motor car provided with a plurality of motors and driven in accordance with travel patterns of various sorts.

When traveling on roads, the ordinary automotive vehicle is driven in accordance with various travel patterns according to the various traffic conditions or other. The electric motor car driven by electric motors is also driven in the same way as above, with the result that the power required to drive the motor car varies or fluctuates greatly according to the travel conditions. On the other hand, in general the general electric motor can be driven at its maximum efficiency under predetermined is operating conditions. Accordingly, when a single motor is mounted on an electric car in order that the required maximum power can be obtained, there exists a problem in that the motor size inevitably increases and further the motor is operated under low efficiency conditions on almost all occasions. To overcome this problem, although a plurality of motors are mounted on the electric motor car, the way of sharing the power required for travel to a plurality of motors, respectively is an important problem to be solved.

SUMMARY OF THE INVENTION

The object of the present invention is to provide an apparatus and a method of controlling power of an electric motor car including a plurality of motors coupled to driven wheels and selected according to the various travel conditions, by which the motors can be always operated under the maximum efficiency conditions.

To achieve the above-mentioned object, the present invention provides a power control apparatus for an electric motor car, comprising: a plurality of motors coupled to driven wheels; travel condition detecting means for detecting travel conditions; required output calculating means for calculating a required travel output according to the travel conditions detected by said travel condition detecting means; and control commanding means for determining motor outputs each allocated to each of said motors according to the required travel output calculated by said required output calculating means so that a total motor power consumption can be minimized, and for outputting control commands to each of said motors on the basis of the determined motor outputs.

In the power control apparatus for an electric motor car according to the present invention, since the motor outputs allocated to a plurality of motors, respectively are determined in such a way that the total motor power consumption can be minimized and further the control commands are applied to the respective motors on the basis of the determined motor outputs, it is possible to supply the motor travel power to the driven wheels of the electric motor car under the minimum power consumption and the maximum efficiency.

BRIEF DESCRIPTION OF THE DRAWINGS

FIG. 1 is a schematic block diagram showing one embodiment of the apparatus for controlling the motor power of an electric motor car according to the present invention;

DETAILED DESCRIPTION OF THE PREFERRED EMBODIMENTS

Figure 1A:
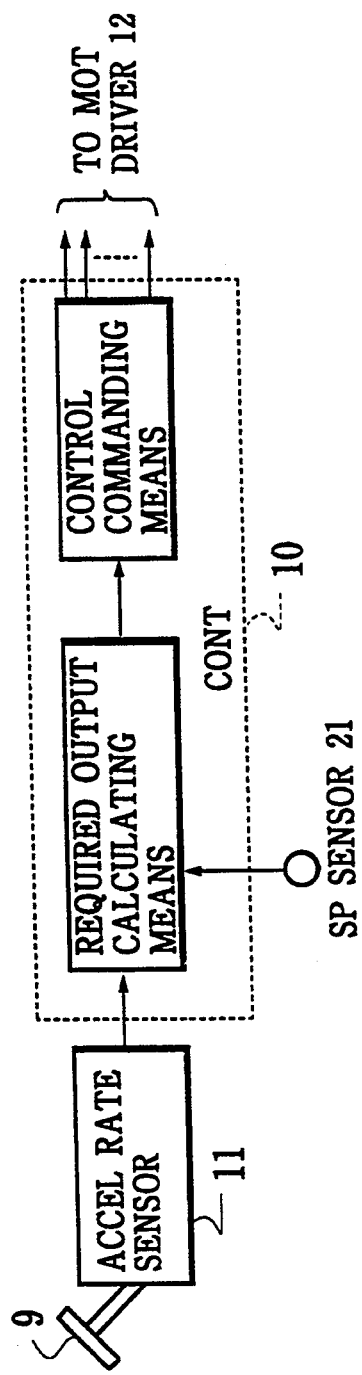
FIG. 1A is a schematic block diagram showing one embodiment of the controller of FIG. 1.
Figure 1B:
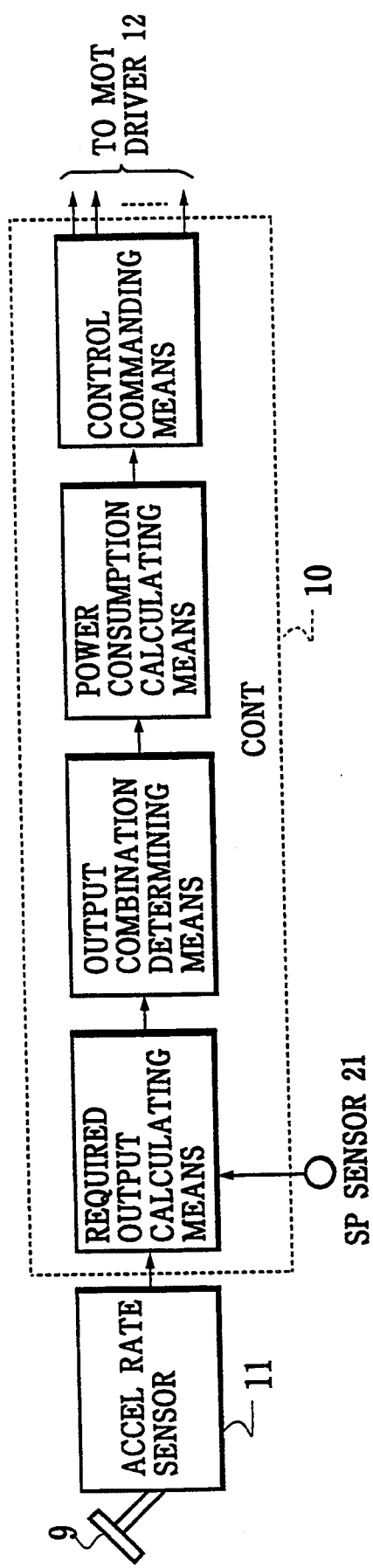
FIG. 1B is a schematic block diagram showing another embodiment of the controller of FIG. 1.

FIG. 1 shows one embodiment of the present invention. In the drawing, the control apparatus of the present invention comprises a controller 10, an accelerator depression rate sensor 11, a plurality of motor drivers 12, a motor speed sensor 21, a plurality of motors 20, a differential gear 24, and two driven wheels 26.

A plurality of motors 20 ($20_1$, $20_2$ ..., $20_n$) are coupled to two vehicle driven wheels 26 via the differential gear 24 in coaxial positional relationship with respect to each other. The controller 10 receives a sensor signal of the accelerator depression rate sensor 11 and another sensor signal of the motor speed sensor 21, respectively. Further, the vehicle driven wheels 26 are the right and left front or rear wheels or all of these wheels. Further, with respect to the motors 20, the motors provided with the same output characteristics can be used, or alternatively the motors provided with different output characteristics can be combined with each other.

The motors $20_1$, $20_2$, ..., $20_n$ are connected to the controller 10 via the motor driver 12 ($12_1$, $12_2$ ..., $12_n$), respectively. The controller 10 including a microcomputer and a memory unit outputs a command signal to each of the motor divers 12, respectively on the basis of the sensor signals applied by the accelerator depression rate sensor 11 and the motor speed sensor 21.

In more detail, the controller 10 comprises required output calculating means and control commanding means (as defined in claim 1). Further, the controller 10 comprises required output calculating means, output combination determining means, power consumption calculating means, and control commanding means (as defined in claim 6).

Figure 2:
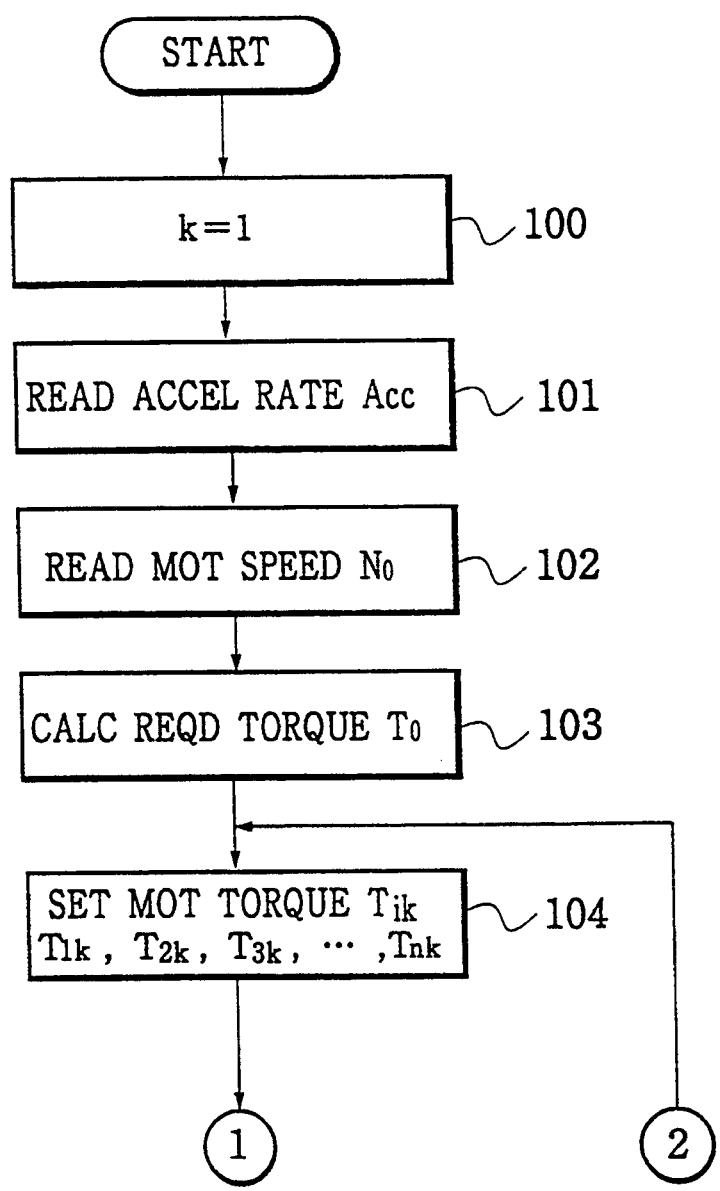
FIG. 2 is a flowchart for assistance in explaining the control procedure of the motor power control apparatus according to the present invention.
Figure 3:
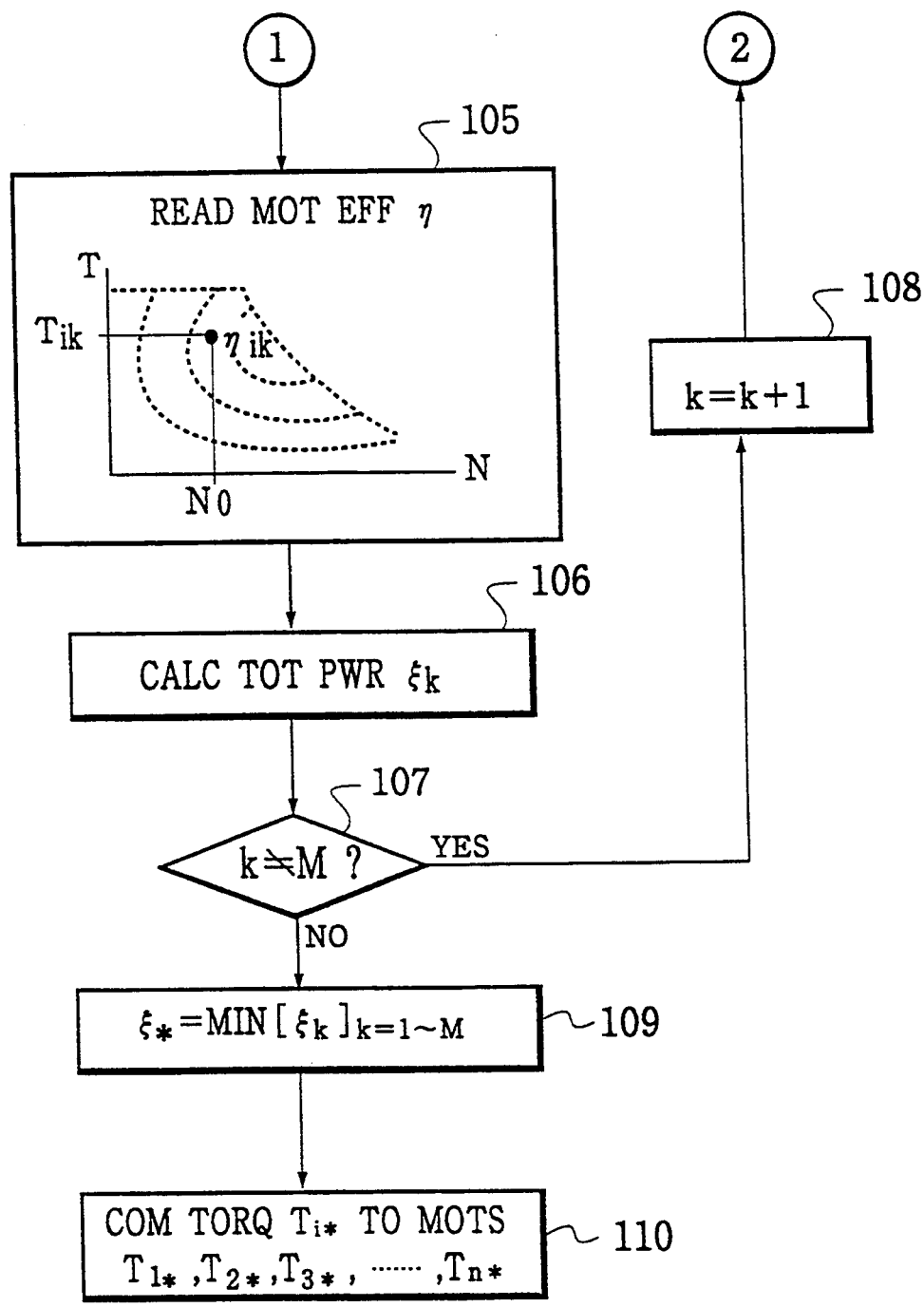
FIG. 3 is another flowchart for assistance in explaining the control procedure of the motor power control apparatus according to the present invention.

The control procedure of the controller 10 will be described hereinbelow with reference to the flowcharts shown in FIGS. 2 and 3.

Figure 4:
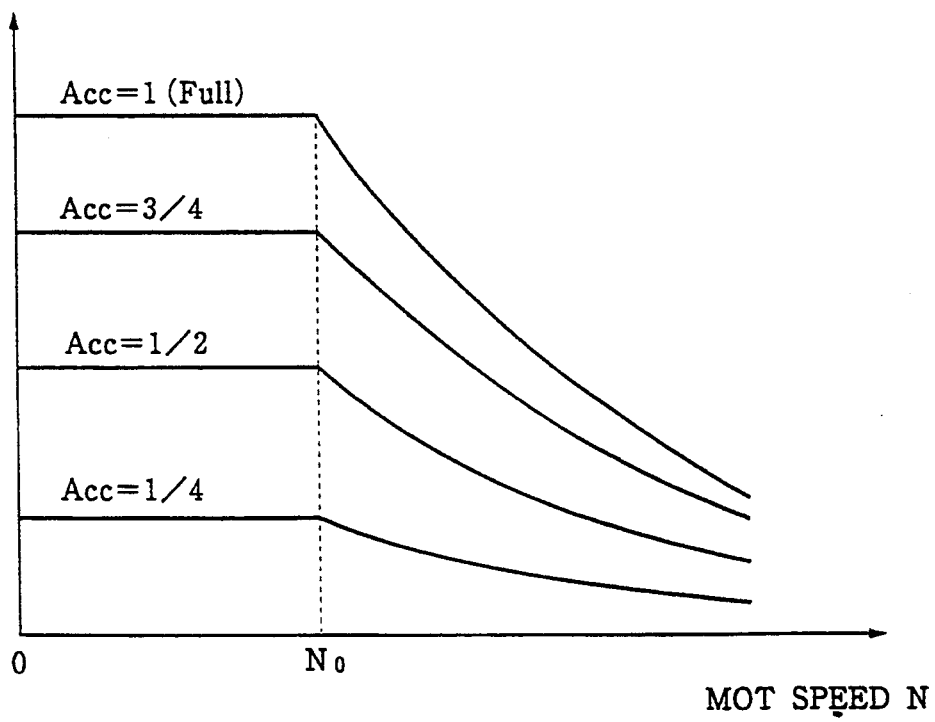
FIG. 4 is a graphical representation showing the characteristics between required torque and speed of the motor used with the embodiment, in which accelerator depression rate is taken as parameter.

In step 100, control first sets the motor output combination number to k=1. In step 101, control reads the current accelerator depression rate Acc from the accelerator depression rate sensor 11 detecting depression rate of an accelerator 9. Further, in step 102, control reads the current motor revolution speed $N_o$ (rpm). In step 103, control calculates a current required torque $T_o$ (kgm) on the basis of the read accelerator depression rate Acc and the read motor speed $N_o$. In more detail, overall motor torque characteristic data indicative of the relationship between the motor speed N and the maximum motor torque T with the accelerator depression rate Acc as parameter as shown in FIG. 4 are previously stored in the memory unit of the controller 10. Therefore, control can determine the maximum overall motor torque T as a current required torque $T_o$(rpm) on the basis of the read motor speed $N_o$ and the read accelerator depression rate Acc.

Further, in step 104, in order to obtain the current overall required torque $T_o$, control determines motor output torques $T_{1k}, T_{2k}, \ldots, T_{nk}$ to be allocated to the motors $20_1, 20_2 \ldots 20_n$, respectively as temporary torques at the combination number of k=1 in accordance with the current travel pattern or mode (i.e. on the basis of the current motor speed and the accelerator depression rate). Further, these temporary torques determined in step 104 include zero motor output torques (no power is supplied). Therefore, the current overall torque $T_o$ can be expressed as follows:

$$T_o = \sum_{i=1}^{n} T_{ik}$$

Figure 5:
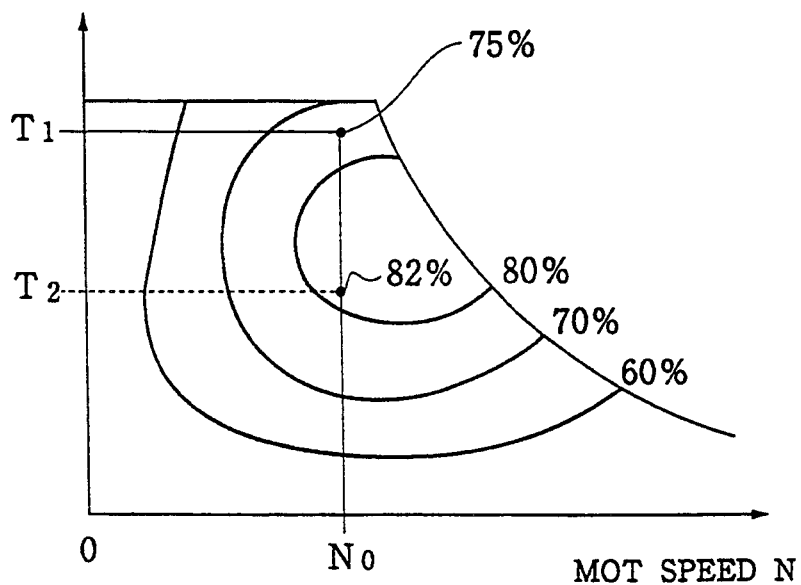
FIG. 5 is a graphical representation showing efficiency characteristics between torque and speed of the motor used with the embodiment.

In step 105, control determines each motor efficiency $\eta_{1k}(\eta_{1k}, \eta_{2k}, \ldots, \eta_{nk})$ obtained when the motor output torque is $T_{1k}(T_{1k}, T_{2k}, \ldots, T_{nk})$ and the motor speed is $N_o$ in accordance with motor efficiency characteristic maps for the motors 20 previously stored in the controller 10, respectively. In FIG. 5, the efficiency characteristics of one motor are shown by way of example.

Further, in step 106, control calculates the total power consumption $\xi_{1k}(\xi_{1k}\xi_{2k}, \ldots, \xi_{nk})$ as follows:

$$\xi_k = 1.03 \times N_o \times \sum_{i=1}^{n} \frac{T_{ik}}{\eta_{ik}}$$

Here, since the combination number k=1, the total power consumption $\xi_1$ for obtaining the temporary motor output torques has been calculated at the combination number k=1.

In step 107, control checks the combination number k reaches M. Since k=1, the check result is NO.

In step 108, control increments the combination number as k=k+1, and returns to the step 104 to determine new temporary motor output torques $T_{1k}(T_{1k}, T_{2k}, \ldots, T_{nk})$ at the motor speed $N_o$ in accordance with the current travel pattern or mode. Further, each motor efficiency $\eta_{1k}$ ($\eta_{1k}, \eta_{2k}, \ldots, \eta_{nk}$) obtained when the motor output torque is $T_{1k}$ ($T_{1k}, T_{2k}, \ldots, T_{nk}$ and the motor speed is $N_o$ is obtained in accordance with motor efficiency characteristic maps for the motors 20 previously stored in the controller 10, respectively. Further, the above-mentioned steps are repeated until the combination number k reaches M to obtain all the total power consumption values $\xi_2, \xi_3, \xi_4, \ldots, \xi_m$ in sequence. When all the total power consumption values have been obtained, since the combination number reaches k =M in step 107, control proceeds to the succeeding step.

In step 109, control selects the combination number K=* at which the total power consumption value can be minimized from among the obtained total power consumption values $\xi_1$ to $\xi_m$.

Finally, in step 110, control outputs the respective output torques $T_1*, T_2*, \ldots, T_n*$ at the combination number k=* (at which the total power consumption can be minimized) to the respective motors $20_1, 20_2, \ldots, 20_n$ as torque commands.

In the above-mentioned control procedure of the controller 10, in the appended claim 1, the steps 101 and 102 correspond travel condition detecting means; the step 103 corresponds required output calculating means; and the steps 104 to 110 correspond the control commanding means, respectively. Further, in the appended claim 6, the steps 101 and 102 correspond to travel condition detecting means; the step 103 corresponds to the required output calculating means; the steps 104, 107 and 108 correspond to the output combination determining means; the steps 105 and 106 correspond to the power consumption calculating means; and steps 109 and 110 correspond to the control commanding means, respectively.

On the basis of the calculated results, the respective motors $20_1, 20_2, \ldots, 20_n$ are driven on the basis of the torque commands transmitted form the controller 10 to the respective motor drivers $12_1, 12_2, \ldots, 12_n$, independently or simultaneously. Since all the motors 20 are coupled to the same wheel drive shaft, all the output torques of the motors are summed up to drive the driven wheels 26 via the differential gear 24, respectively.

As described above, in the motor power control apparatus according to the present invention, a plurality of combinations of the motor output torques $T_{1k}, T_{2k}, \ldots, T_{nk}$ each allocated to each of the motors $20_1, 20_2, \ldots, 20_n$ are obtained for each of the combination numbers k=1 to M. Further, the total motor power consumptions are calculated for all the combination numbers, in order to select a combination number at which the total motor consumption can be minimized. Further, the motor torques are allocated to the respective motors in accordance with the motor torques calculated at the selected combination number. Consequently, it is possible to always drive the respective motors at high efficiency conditions under which the total motor power consumption can be minimized, above-mentioned control operation, since the efficiency characteristic maps between the motor speed and the motor output torque of the respective motors 20 are previously stored in the controller, the optimum torque combination in the minimum power consumption can be calculated and selected by only calculation by the controller 10, there exist such advantages that the apparatus can be simplified in construction and reduced in size and further in cost.

Further, as the number of the motors increases, maximum motor efficiency can be finely obtained for motor torques required for the various travel conditions. However, in the actual vehicle travel modes, since the average travel patterns can be limited to a predetermined number, it is preferable to determined the number of the motors according to the number of the average travel patterns. In the same way, the number (k) of the combinations of motor torques is preferably determined according to the number of the average travel patterns.

What is claimed is:

1. A power control apparatus for an electric motor car, comprising:
    a plurality of motors coupled to driven wheels;
    travel condition detecting means for detecting travel conditions;
    required output calculating means for calculating a required travel output according to the travel conditions detected by said travel condition detecting means; and control commanding means for determining motor outputs each allocated to each of said motors according to the required travel output calculated by said required output calculating means so that a total motor power consumption can be minimized, and for outputting control commands to each of said motors on the basis of the determined motor outputs.

2. The power control apparatus for an electric motor car of claim 1, wherein said travel detecting means comprises:

an accelerator depression rate sensor for detecting depression rate of an accelerator; and a speed sensor for detecting the number of revolutions of the driven wheels.

3. The power control apparatus for an electric motor car of claim 2, wherein the required travel output calculated by said required output calculating means is represented by a torque value calculated with a revolution speed detected by said speed sensor and a depression rate by said accelerator depression rate sensor.

4. The power control apparatus for an electric motor car of claim 1, wherein the driven wheels are any of front wheels and rear wheels of an electric motor car.

5. The power control apparatus for an electric motor car of claim 1, wherein at least one of said motors have different output characteristics from that of other motors.

6. A power control apparatus for an electric motor car, comprising:

a plurality of motors coupled to driven wheels;

travel condition detecting means for detecting travel conditions;

required output calculating means for calculating a required travel output according to the travel conditions detected by said travel condition detecting means;

output combination determining means for determining a plurality of motor output combinations for the required travel output calculated by said required output calculating means, each allocated to each of a plurality of said motors;

power consumption calculating means for calculating total motor power consumption of said motors for each of the motor output combinations determined by said output combination determining means; and control commanding means for selecting one motor output combination at which the total power consumption calculated by said consumption calculating means can be minimized from a plurality of the motor output combinations determined by said output combination determining means, and outputting control commands to each of said motors on the basis of the selected motor output combination.

7. The power control apparatus for an electric motor car of claim 6, wherein said travel detecting means comprises:

an accelerator depression rate sensor for detecting depression rate of an accelerator; and a speed sensor for detecting the number of revolutions of the driven wheels.

8. The power control apparatus for an electric motor car of claim 7, wherein the required travel output calculated by said required output calculating means is represented by a torque value calculated with a revolution speed detected by said speed sensor and a depression rate by said accelerator depression rate sensor.

9. The power control apparatus for an electric motor car of claim 7, wherein said power consumption calculating means calculates each motor efficiency corresponding to each torque allocated to each motor determined by said output combination determining means, respectively in accordance with each map previously determined for each motor, and calculates total motor power consumption on the basis of the obtained efficiency and the allocated torque and a revolution speed detected by said speed sensor.

10. The power control apparatus for an electric motor car of claim 6, wherein the driven wheels are any of front wheels and rear wheels of an electric motor car.

11. The power control apparatus for an electric motor car of claim 6, wherein at least one of said motors have different output characteristics from that of other motors.

12. A method of controlling power of an electric motor car, comprises the steps of:

detecting travel conditions;

calculating a required travel output according to the detected travel conditions;

determining required travel output allocated to a plurality of motors coupled to driven wheels, respectively, so that a total motor power consumption of the motors can be minimized; and outputting control commands to the motors, respectively.

13. The power control apparatus for an electric motor car of claim 1, wherein a plurality of said motors have same output characteristics.

14. The power control apparatus for an electric motor car of claim 6, wherein a plurality of said motors have same output characteristics.

* * * * *